P. JABLOCHKOFF.
Batteries.
No. 219,056. Patented Aug. 26, 1879.
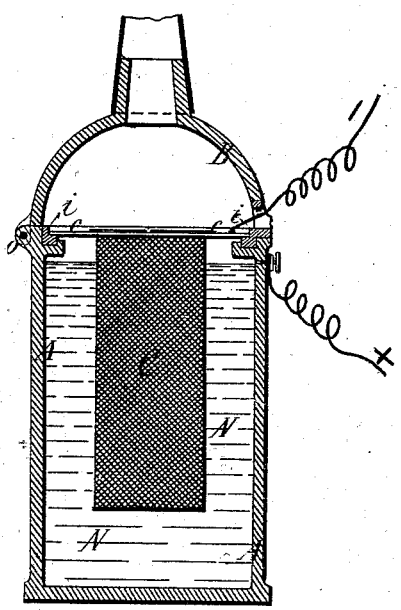
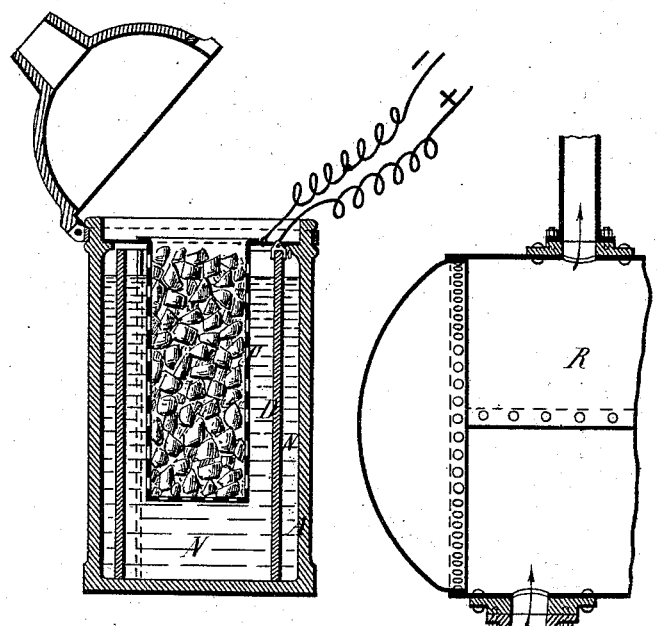
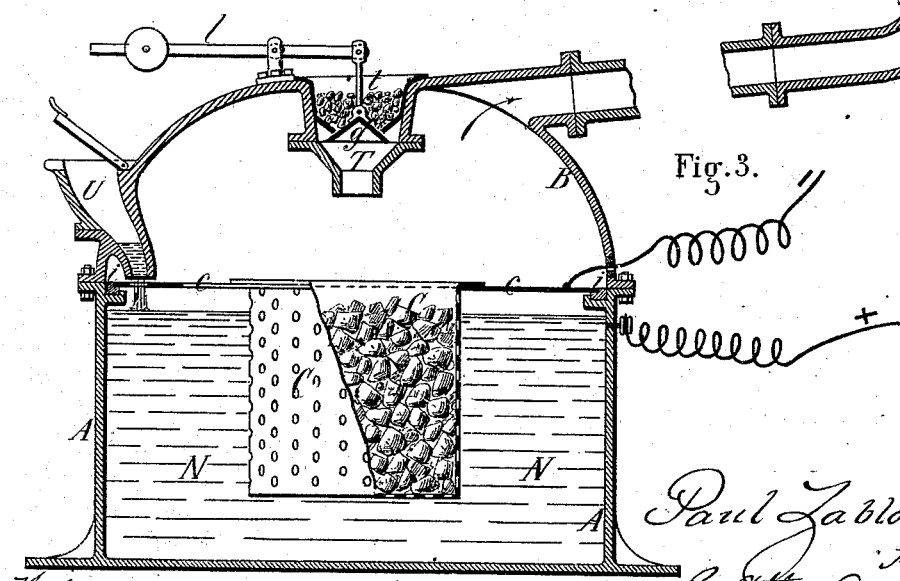

UNITED STATES PATENT OFFICE.

PAUL JABLOCHKOFF, OF PARIS, FRANCE.

IMPROVEMENT IN BATTERIES.

Specification forming part of Letters Patent No. 219,056, dated August 26, 1879; application filed July 12, 1878; patented in England, February 5, 1877.

*To all whom it may concern:*

Be it known that I, PAUL JABLOCHKOFF, of Paris, France, engineer, have invented an Improved Apparatus for Generating Electricity and Motive Power, of which the following is a specification.

In ordinary galvanic batteries the electric current results from the chemical action of an acid liquid upon a metal. According to my present invention the current is produced by the action upon the carbon of a solid body in a state of fusion.

Instead of taking the metal for a negative electrode of a battery—that is, the electrode which is consumed in the action—I take coke, or an artificial conglomerate of carbonaceous matter possessing the same qualities, and I act upon this electrode by means of nitrate of potash, or of soda, or of ammonia, in a state of fusion. I prefer to employ the nitrate of soda on account of its cheapness. The carbonaceous matter is acted upon by the molten nitrate in the same manner as zinc is acted upon by the different acids or salts in the ordinary batteries.

As the second electrode, I place in the same liquid either platinum or other metals that are not acted upon by the liquid in the presence of carbon. The crucible itself in which the nitrate is fused may constitute the positive electrode.

For introducing the carbon into the liquid the former may have attached to it a metal rod, which serves for attachment of the conducting-wires; or I place a metal grating or perforated metal receptacle in the liquid in which the carbon is contained, such grating or receptacle being insulated from the crucible if this constitutes the second electrode. In the latter arrangement the carbon may be added from time to time, as in a furnace, in proportion as it is consumed.

For bringing the battery into action in the first instance the nitrates may either be fused in advance in the crucible and the carbon be then introduced, or the nitrate may be placed in the crucible in a pulverulent state, and the carbon be ignited and plunged into the nitrate, which will become fused thereby.

While the battery is in operation large quantities of gases are developed, similar in their nature to those produced by the combustion of gunpowder. These gases, collected by any suitable arrangement—as, for instance, in a boiler or closed chamber—may be utilized as motive power, so that my improved battery serves as a source both of electricity and of motive power.

By mixing various metallic salts with the nitrates the double effect may be obtained of regulating the intensity of the action of the battery and of obtaining metallic deposits upon the positive electrode, as in the ordinary electroplating process.

According to one arrangement of batteries constructed according to my before-described invention, the crucible containing the nitrate and carbon forms the positive electrode, the carbon being suspended in the liquid nitrate in a wire-gauze cylinder attached to a cross-bar the ends of which rest upon a ring of insulating material on the top of the crucible. The latter is closed in by a hinged cover having an aperture, to which is connected a pipe for conveying the gases generated to wherever required.

According to another arrangement, the crucible is made of earthenware, glass, or other suitable non-metallic substance, centrally within which is placed the wire-gauze cylinder containing the carbon, and surrounding this a metal cylinder constituting the positive electrode; or this may simply consist of a rod or bar of metal.

If it be desired to employ the battery principally or entirely for utilizing the gases generated as motive power, as before described, the crucible or vessel containing the nitrate and carbon is closed at top, and is provided with a pipe leading to a boiler or closed vessel for collecting the gases under any desired pressure. The top or dome of the crucible may in this, as also in the previous arrangements, be provided with a hopper closed by a valve, through which fresh carbonaceous matter may be introduced from time to time, and also with a second hopper for the addition of nitrate when required.

Figure 1 of the drawings shows a vertical section of one element of a battery, of which the outer receptacle, A, is of metal, and can itself constitute the positive electrode. The negative electrode consists of the charcoal or coke contained in the wire-gauze cylinder C, which is suspended by a frame, c, on the top of the vessel A, the frame being insulated by the introduction of insulating material at i. Outside the vessel C is the molten nitrate N. In consequence of the large amount of gases evolved from the chemical action the vessel A is closed by a cover, B, provided with a pipe, which is led to a chimney. The cover B opens on a hinge at O, for introducing the charcoal into the cylinder C.

Fig. 2 shows a battery of which the casing is of earthenware, porcelain, or other non-metallic substance. Centrally within it is the charcoal-cylinder C, forming the negative pole. The positive pole can be attached to a metal rod passing down in the nitrate, or it may be supported by a cylinder, D, split longitudinally like the zinc cylinder of a Bunsen's battery.

Fig. 3 shows an arrangement for collecting and utilizing the gases produced by the chemical action of the battery. The casing A is closed by a dome-shaped cover, B, communicating by a pipe with any suitable reservoir, such as shown at R, similar to a steam-boiler, in which the gases are collected and stored up, and whence they are conducted to any suitable motor-engine. This apparatus could be used exclusively for producing gases to be used in motor-engines—that is, the electric current produced need not be made use of.

For supplying the apparatus with carbonaceous matter without loss of gas various arrangements may be employed. As shown on the drawings, the dome B is provided with a hopper, T, in which is a second one, t, having a conical valve, g, which is kept closed by a weighted lever, l. On opening the valve by means of the lever the charcoal is fed into the cylinder without allowing gas to escape. For introducing the nitrate, a second hopper, U, closed by a cover, is provided.

Having thus described the nature of my invention and in what manner the same is to be performed, I claim—

1. In an electric apparatus, fused nitrates constituting the positive pole, and carbonaceous matter the negative pole, of the battery, substantially as described, and whereby the electric current is produced by the reaction of the fused nitrates upon said carbonaceous matter.

2. In an electric apparatus, fused nitrates constituting the positive pole, and carbonaceous matter the negative pole, of the battery, and a closed receiver, into which the gases generated in the apparatus are gathered, substantially as described, and for the purpose of motive power.

In testimony whereof I have signed my name to this specification before two subscribing witnesses.

PAUL JABLOCHKOFF.

Witnesses:
  ROBT. M. HOOPER,
  J. ARMENGAUD, Jeune.